United States Patent
Ohta et al.

(10) Patent No.: US 9,531,036 B2
(45) Date of Patent: Dec. 27, 2016

(54) GARNET-TYPE ION CONDUCTING OXIDE, COMPLEX, LITHIUM SECONDARY BATTERY, MANUFACTURING METHOD OF GARNET-TYPE ION CONDUCTING OXIDE AND MANUFACTURING METHOD OF COMPLEX

(71) Applicant: KABUSHIKI KAISHA TOYOTA CHUO KENKYUSHO, Nagakute-shi, Aichi-ken (JP)

(72) Inventors: Shingo Ohta, Nagakute (JP); Yuki Goto, Nagakute (JP); Tooru Saeki, Nagakute (JP); Shogo Komagata, Nagakute (JP); Takahiko Asaoka, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 296 days.

(21) Appl. No.: 14/464,202

(22) Filed: Aug. 20, 2014

(65) Prior Publication Data
US 2015/0056519 A1    Feb. 26, 2015

(30) Foreign Application Priority Data

Aug. 23, 2013  (JP) .................................. 2013-173150

(51) Int. Cl.
*H01M 10/0562*  (2010.01)
*H01M 10/052*  (2010.01)
(Continued)

(52) U.S. Cl.
CPC ........ *H01M 10/0562* (2013.01); *C01G 25/006* (2013.01); *C01G 33/006* (2013.01); (Continued)

(58) Field of Classification Search
CPC .... H01M 4/131; H01M 4/485; H01M 10/052; H01M 10/0562; H01M 2300/0071; C04B 2235/3203; C04B 2235/3208; C04B 2235/322; C04B 2235/3227; C04B 2235/3244; C04B 2235/764; C04B 2235/77; C04B 2235/85; C04B 35/486; C01G 25/006; C01G 33/006; C01G 35/006; C01B 35/121; C01P 2002/72; C01P 2004/03; Y02P 70/54; Y02E 60/122; Y02T 10/7011
See application file for complete search history.

(56) References Cited

U.S. PATENT DOCUMENTS

2004/0151986 A1  8/2004  Park et al.
2008/0241665 A1  10/2008  Sano
(Continued)

FOREIGN PATENT DOCUMENTS

DE  10 2007 030 604 A1  1/2009
EP     2 099 086 A1     3/2009
(Continued)

OTHER PUBLICATIONS

Murugan et al., "Fast Lithium Ion Conduction in Garnet-Type $Li_7La_3Zr_2O_{12}$," Angew. Chem. Int. 2007, vol. 46, pp. 7778-7781.
(Continued)

*Primary Examiner* — Brittany Raymond
(74) *Attorney, Agent, or Firm* — Oliff PLC

(57) ABSTRACT

An all-solid lithium secondary battery 20 includes a solid electrolyte layer 10 composed of a garnet-type oxide, a positive electrode 12 formed on one surface of the solid electrolyte layer 10 and a negative electrode 14 formed on the other surface of the solid electrolyte layer 10. This all-solid lithium secondary battery 20 includes an integrally sintered complex of the solid electrolyte layer 10 and the positive electrode active material layer 12a. This complex is
(Continued)

obtained by integrally sintering a stacked structure of an active material layer and a solid electrolyte layer. The solid electrolyte layer includes: abase material mainly including a fundamental composition of $Li_{7+X-Y}(La_{3-X},A_x)(Zr_{2-Y},T_Y)O_{12}$, wherein A is one or more of Sr and Ca, T is one or more of Nb and Ta, and $0 \le X \le 1.0$ and $0 \le Y < 0.75$ are satisfied, as a main component; and an additive component including lithium borate and aluminum oxide.

6 Claims, 10 Drawing Sheets

(51) Int. Cl.

| | | |
|---|---|---|
| H01M 4/04 | (2006.01) | |
| H01M 4/131 | (2010.01) | |
| H01M 4/1391 | (2010.01) | |
| H01M 4/485 | (2010.01) | |
| H01M 4/505 | (2010.01) | |
| H01M 4/525 | (2010.01) | |
| H01M 4/58 | (2010.01) | |
| C04B 35/486 | (2006.01) | |
| C04B 35/626 | (2006.01) | |
| C01G 25/00 | (2006.01) | |
| C01G 33/00 | (2006.01) | |
| C01G 35/00 | (2006.01) | |
| C01B 35/12 | (2006.01) | |

(52) U.S. Cl.
CPC .......... *C01G 35/006* (2013.01); *C04B 35/486* (2013.01); *C04B 35/6261* (2013.01); *C04B 35/62675* (2013.01); *C04B 35/62685* (2013.01); *H01M 4/0471* (2013.01); *H01M 4/131* (2013.01); *H01M 4/1391* (2013.01); *H01M 4/485* (2013.01); *H01M 4/505* (2013.01); *H01M 4/525* (2013.01); *H01M 4/5825* (2013.01); *H01M 10/052* (2013.01); *C01B 35/121* (2013.01); *C01P 2002/72* (2013.01); *C01P 2004/03* (2013.01); *C04B 2235/322* (2013.01); *C04B 2235/3203* (2013.01); *C04B 2235/3208* (2013.01); *C04B 2235/3227* (2013.01); *C04B 2235/3244* (2013.01); *C04B 2235/3251* (2013.01); *C04B 2235/3409* (2013.01); *C04B 2235/44* (2013.01); *C04B 2235/764* (2013.01); *C04B 2235/77* (2013.01); *C04B 2235/85* (2013.01); *H01M 2300/0071* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2009/0081554 A1 | 3/2009 | Takada et al. |
| 2009/0226790 A1 | 9/2009 | Kanamura et al. |
| 2010/0047696 A1 | 2/2010 | Yoshida et al. |
| 2010/0203383 A1 | 8/2010 | Weppner |
| 2011/0027661 A1 | 2/2011 | Okazaki et al. |
| 2011/0244337 A1 | 10/2011 | Ohta et al. |
| 2014/0154586 A1* | 6/2014 | Hayashi ............ H01M 10/052 429/322 |
| 2014/0162113 A1 | 6/2014 | Ohta et al. |
| 2014/0295287 A1* | 10/2014 | Eisele ............... C01G 25/006 429/319 |

FOREIGN PATENT DOCUMENTS

| | | |
|---|---|---|
| EP | 2 159 867 A1 | 3/2010 |
| JP | A-06-044971 | 2/1994 |
| JP | A-11-283664 | 10/1999 |
| JP | A-2001-035495 | 2/2001 |
| JP | A-2004-235155 | 8/2004 |
| JP | A-2005-112710 | 4/2005 |
| JP | A-2007-005279 | 1/2007 |
| JP | A-2008-084798 | 4/2008 |
| JP | A-2008-226639 | 9/2008 |
| JP | A-2008-251225 | 10/2008 |
| JP | A-2009-146739 | 7/2009 |
| JP | A-2009-158476 | 7/2009 |
| JP | A-2009-193940 | 8/2009 |
| JP | A-2009-238739 | 10/2009 |
| JP | A-2010-102929 | 5/2010 |
| JP | A-2010-140725 | 6/2010 |
| JP | 2010-202499 A | 9/2010 |
| JP | A-2010-192373 | 9/2010 |
| JP | A-2010-272344 | 12/2010 |
| JP | 2011-051800 A | 3/2011 |
| JP | A-2011-129474 | 6/2011 |
| JP | 2013-032259 A | 2/2013 |
| WO | WO 2007/004590 A1 | 1/2007 |
| WO | WO 2009/003695 A2 | 1/2009 |
| WO | WO 2010/090301 A1 | 8/2010 |

OTHER PUBLICATIONS

Awaka et al., "Synthesis and structure analysis of tetragonal $Li_7La_3Zr_2O_{12}$ with the garnet-related type structure," *Journal of Solid State Chemistry*, 182 (2009) pp. 2046-2052.

Thangadurai et al., "$Li_6ALa_2Nb_2O_{12}$(A=Ca, Sr, Ba): New Class of Fast Lithium Ion Conductors with Garnet-Like Structure," *Journal, J. Am. Ceram. Society*, 411-418 (2005), vol. 88, No. 2, pp. 411-418.

Kotobuki et al., "Compatibility of $Li_7La_3Zr_2O_{12}$ Solid Electrolyte to All-Solid-State Battery Using Li Metal Anode," *Journal of the Electrochemical Society*, Aug. 17, 2010, pp. A1076-A1079, vol. 157, No. 10.

Sep. 11, 2012 International Search Report issued in International Application No. PCT/JP2012/065756 (with translation).

Aug. 13, 2014 Office Action issued in U.S. Appl. No. 13/132,795.

May 15, 2012 Office Action issued in Japanese Patent Application No. 2010-014341 (with translation).

Feb. 26, 2013 Office Action issued in Japanese Patent Application No. 2009-122991 (with partial translation).

Aug. 18, 2011 International Preliminary Report on Patentability issued in International Application No. PCT/JP2010/051741.

Apr. 26, 2010, International Search Report issue in International Application No. PCT/JP2010/051741.

Apr. 26, 2010 Written Opinion of the International Searching Authority in International Application No. PCT/JP2010/051741.

U.S. Appl. No. 14/127,825, filed Dec. 19, 2013 in the name of Ohta et al.

U.S. Appl. No. 13/132,795, filed Jun. 3, 2011 in the name of Ohta et al.

* cited by examiner

GARNET-TYPE ION CONDUCTING OXIDE, COMPLEX, LITHIUM SECONDARY BATTERY, MANUFACTURING METHOD OF GARNET-TYPE ION CONDUCTING OXIDE AND MANUFACTURING METHOD OF COMPLEX

BACKGROUND OF THE INVENTION

1. Field of the Invention

The present invention relates to a garnet-type ion conducting oxide, a complex, a lithium secondary battery, a manufacturing method of a garnet-type ion conducting oxide and a manufacturing method of a complex.

2. Description of the Related Art

Garget-type oxides such as $Li_7La_3Zr_2O_{12}$ and $Li_7ALa_3Nb_2O_{12}$ (A=Ca, Sr or Ba) synthesized by the solid-phase reaction method have been proposed conventionally as a solid electrolyte configured to conduct lithium ion (Non-Patent Literatures 1 to 3). It has been reported that this solid electrolyte has the conductivity of 1.9 to $2.3 \times 10^{-4}$ $Scm^{-1}$ (25° C.) and activation energy of 0.34 eV. The inventors have studied a solid electrolyte of $Li_7La_3Zr_2O_{12}$-based garnet-type ion conducting oxide among garnet-type oxides having excellent chemical stability and a wide potential window. For example, it has been proposed that the Zr sites in this solid electrolyte should be substituted with an element such as Nb, in order to enhance the conductivity (see, for example, Patent Literature 1). This solid electrolyte has high conductivity but needs treatment at high temperature such as 1200° C. It has been proposed, on the other hand, that La sites should be additionally substituted with an alkaline-earth metal, in order to minimize reduction of the electric conductivity and reduce the firing energy (see, for example, Patent Literature 2).

A solid electrolyte including Li, La, Zr, O and Al has been proposed as $Li_7La_3Zr_2O_{12}$-based solid electrolyte (see, for example, Patent Literature 3). According to the disclosure of this prior art, addition of Al to $Li_7La_3Zr_2O_{12}$-based solid electrolyte provides the solid electrolyte with the density and the conductivity required for the solid electrolyte material.

CITATION LIST

Patent Literature

[PTL 1] Japanese Unexamined Patent Application Publication No. 2010-202499
[PTL 2] Japanese Unexamined Patent Application Publication No. 2013-32259
[PTL 3] Japanese Unexamined Patent Application Publication No. 2011-51800

Non-Patent Literature

[NPL 1] Angew. Chem. Int. Ed. 2007, vol 46, pages 7778-7781;
[NPL 2] Journal of Solid State Chemistry, 182, pages 2046-2052, 2009; and
[NPL 3] J. Am. Ceram. Soc., 88[2], pages 411-418, 2005.

SUMMARY OF THE INVENTION

The solid electrolyte of Patent Literature 2 described above aims to reduce the firing temperature, but is not yet sufficient. Further improvement is accordingly desired. The solid electrolyte of Patent Literature 3 needs heat treatment at 1125° C. to 1250° C. for sintering and does not aim to reduce the firing temperature. There is still a difference between the sintering temperature of the solid electrolyte layer and the sintering temperature of the active material layer, so that integral sintering of the solid electrolyte layer and the active material layer has not yet been accomplished.

In order to solve at least part of the problems described above, an object of the invention is to provide a manufacturing method of a garnet-type ion conducting oxide allowing for lower-temperature sintering, a manufacturing method of a complex, a complex and a lithium secondary battery. An object of the invention is also to provide a manufacturing method of a complex in which a solid electrolyte layer and an active material layer are sintered integrally, a complex and a lithium secondary battery.

As the result of intensive study to achieve the object described above, the inventors have found that addition of lithium borate and aluminum oxide to a garnet-type ion conducting oxide, for example, $Li_{7+X-Y}(La_{3-x},Ca_x)(Zr_{2-Y},Nb_Y)O_{12}$, where $0 \leq X \leq 1.0$ and $0 \leq Y < 0.75$ are satisfied, allows for the lower-temperature firing or sintering and completed the invention.

According to one aspect, there is provided a garnet-type ion conducing oxide configured to conduct lithium, comprising: a base material mainly including a composite oxide comprised of at least Li, La, Zr, Al, an element A, wherein A is one or more of Ca and Sr, and an element T, wherein T is one or more of Nb and Ta; and a grain boundary product comprised of at least B and the element A.

According to another aspect, there is provided a complex in which a solid electrolyte layer configured to conduct lithium and an active material layer configured to absorb and release lithium are stacked. The complex has an integrally sintered stacked structure of the active material layer and the solid electrolyte layer comprised of the garnet-type ion conducting oxide described above.

According to another aspect, there is provided a lithium secondary battery, comprising the complex described above.

According to another aspect, there is provided a manufacturing method of a garnet-type ion conducting oxide configured to conduct lithium. The manufacturing method comprises a sintering process of sintering a molded body at 900° C. or lower temperature, wherein the molded body is produced by mixing and molding a base material mainly including a fundamental composition of $Li_{7+X-Y}(La_{3-x},A_x)(Zr_{2-Y},T_Y)O_{12}$, wherein A is one or more of Sr and Ca, T is one or more of Nb and Ta, and $0 \leq X \leq 1.0$ and $0 \leq Y < 0.75$ are satisfied, as a main component with an additive component including lithium borate and aluminum oxide.

According to another aspect, there is provided a manufacturing method of a complex in which a solid electrolyte layer configured to conduct lithium and an active material layer configured to absorb and release lithium are stacked. The manufacturing method comprises a sintering process of sintering a stacked structure of the solid electrolyte layer and the active material layer at 900° C. or lower temperature, wherein the solid electrolyte layer is obtained by mixing a base material mainly including a fundamental composition of $Li_{7+X-Y}(La_{3-x},A_x)(Zr_{2-Y},T_Y)O_{12}$, wherein A is one or more of Sr and Ca, T is one or more of Nb and Ta, and $0 \leq X \leq 1.0$ and $0 \leq Y < 0.75$ are satisfied, as a main component with an additive component including lithium borate and aluminum oxide.

The above aspects of the invention allow for the lower-temperature sintering. This advantageous effect may be attributed to the following reason. For example, when both lithium borate and aluminum oxide are used as additive materials, it is expected that chemical reaction between the additive materials and chemical reactions between the additive materials and the base material occur at about 700° C. and lead to mutual diffusion. Using the two or more additive materials further accelerates dissolution and diffusion of the components of these additive materials and causes the respective element components to diffuse the grain boundary of the base material. This attracts the particles to each other to fill the gaps and accelerates the grain growth of the base material, thus allowing for the lower-temperature sintering. It is accordingly expected that the solid electrolyte of the garnet-type ion conducting oxide can be sintered integrally with an active material layer having a lower sintering temperature (for example, 700° C. to 800° C.) than the sintering temperature of this solid electrolyte.

DESCRIPTION OF THE PREFERRED EMBODIMENTS

Figure 1:
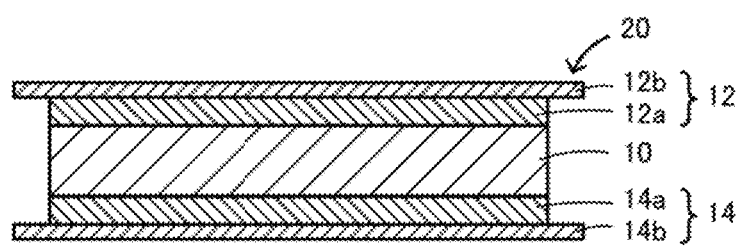
FIG. 1 is a diagram illustrating the schematic configuration of an all-solid lithium secondary battery 20.

A garnet-type ion conducting oxide according to the invention configured to conduct lithium includes a base material mainly including a composite oxide comprised of at least Li, La, Zr, Al, an element A (where A is one or more of Ca and Sr) and an element T (where T is one or more of Nb and Ta), and a grain boundary product comprised of at least B and the element A.

In the garnet-type ion conducting oxide of the invention, the base material may mainly include a fundamental composition of $(Li_{7-Y-6Z}, Al_{2Z})(La_{3-x}, A_{x-x'})Zr_{2-Y}, T_Y)O_{12}$ (where $0 \leq X \leq 1.0$, $0 \leq Y < 0.75$, $0 \leq Z \leq 0.1$ and $0 \leq X' < X$ are satisfied) as the main component. Herein X is preferably not less than 0.15 and is more preferably not less than 0.20. X is also preferably not greater than 0.85 and is more preferably not greater than 0.75. Such setting advantageously allows for low-temperature firing. In this fundamental composition formula, Y is preferably not less than 0.15 and is more preferably not less than 0.20. Y is also preferably not greater than 0.60 and is more preferably not greater than 0.50. Such setting further enhances the electric conductivity or more specifically lithium ion conductivity. With regard to these variables X and Y, X may be equal to Y or alternatively X may be different from Y, but X<Y is more preferable. The relationship of X<Y further enhances the lithium ion conductivity. X' represents, for example, an amount of the element A withdrawn from the base material to the grain boundary during sintering and may be set to 0 or may alternatively be set to not less than 0. Such withdrawal of the element A may result in introducing Al into the Li site. Z may be not less than 0.01 and is preferably not greater than 0.09 and is more preferably not greater than 0.075. Z represents an amount of Al, with which the Li site is substituted, and the smaller value is preferable.

In the garnet-type ion conducting oxide of the invention, the grain boundary product comprised of at least B and the element A may include lithium, boron and calcium or may include calcium lithium borate and lithium borate. Alternatively the grain boundary product may include lithium, boron and strontium or may include strontium lithium borate. The calcium lithium borate may be produced by, for example, reaction of lithium borate as an additive component with calcium contained in the base material. The strontium lithium borate may be produced by, for example, reaction of lithium borate as an additive component with strontium contained in the base material. The lithium borate is, for example, $Li_3BO_3$ (hereinafter referred to as LBO), $Li_2B_4O_7$ or $LiBO_2$, and $Li_3BO_3$ is more preferable among them. This is because LBO has the lower reactivity with the base material. The grain boundary formed to include at least B and the element A enables the garnet-type ion conducting oxide to be sintered at the lower temperature.

The garnet-type ion conducting oxide of the invention may have a volume ratio of the grain boundary product to the base material in the range of not lower than 1.0 vol % and not higher than 20 vol %. The volume ratio in this range desirably enables the garnet-type ion conducting oxide to be sintered at the lower temperature and also further enhances the relative density. This volume ratio is more preferably not lower than 2.0 vol % and is furthermore preferably not lower than 5.0 vol %. This volume ratio is also more preferably not higher than 18.0 vol % and is furthermore preferably not higher than 15.0 vol %. The grain boundary product may depend on, for example, the volume ratio of lithium borate added to the base material.

In the garnet-type ion conducting oxide of the invention, the higher relative density is more preferable; for example, the relative density is preferably not lower than 50%, is more preferably not lower than 60% and is furthermore preferably not lower than 80%. In the garnet-type ion conducting oxide of the invention, the electric conductivity is preferably not lower than $3.0 \times 10^{-5}$ S/cm, is more preferably not lower than $1.0 \times 10^{-4}$ S/cm, and is furthermore preferably not lower than $1.5 \times 10^{-4}$ S/cm. The garnet-type ion conducting oxide of the invention has a specified ratio of grain boundary resistance that is preferably not higher than 70%, is more preferably not higher than 60% and is furthermore preferably not higher than 50%. The procedure of determining this ratio of grain boundary resistance performs impedance measurement of the garnet-type ion conducting oxide, determines an intragranular resistance Rb and a grain boundary resistance Rgb of a Nyquist plot and calculates the equation of (grain boundary resistance Rgb)/(intragranular resistance Rb+grain boundary resistance Rgb)×100.

A complex according to the invention is a stacked structure of a solid electrolyte of the garnet-type ion conducting oxide configured to conduct lithium described above and an active material layer configured to absorb and release lithium. This complex may be an integrally sintered stacked structure of an active material layer and a solid electrolyte layer, wherein the solid electrolyte layer includes: a base material mainly including a fundamental composition of $Li_{7+X-Y}(La_{3-x},A_x)(Zr_{2-Y},T_Y)O_{12}$ (where A is one or more of Sr and Ca, T is one or more of Nb and Ta and $0 \le X \le 1.0$ and $0 \le Y < 0.75$ are satisfied) as the main component; and an additive component including lithium borate and aluminum oxide. This complex may be produced by a manufacturing method described later. This complex has the additive component, which includes lithium borate and aluminum oxide, mixed with the base material and accordingly allows for the lower-temperature sintering of the solid electrolyte layer. This further reduces the difference in sintering temperature between the solid electrolyte layer and the active material layer and enables the solid electrolyte layer and the active material layer to be sintered integrally. In this complex, the solid electrolyte layer may have the molar ratio of aluminum oxide added to the base material in the range of higher than 0 mol % but not higher than 0.16 mol %. The solid electrolyte layer may have the volume ratio of lithium borate to the sum of the base material and lithium borate in the range of not lower than 1.0 vol % and not higher than 10 vol %. In the solid electrolyte layer, the base material may satisfy $0.2 \le Y$. This complex is more preferably sintered at or lower than 850° C. and is furthermore preferably sintered at or lower than 800° C. The active material included in the active material layer is described in detail layer but is, for example, a complex compound containing lithium and a transition metal, such as a composite oxide or a phosphate compound. This active material may be, for example, $Li_{(1-n)}MnO_2$, $Li_{(1-n)}Mn_2O_4$, $Li_{(1-n)}CoO_2$, $Li_{(1-n)}NiO_2$ (0<n<1, the same shall apply hereafter) or $LiFePO_4$.

A lithium secondary battery according to the invention includes the complex described above. This lithium secondary battery includes: a positive electrode having a positive electrode active material configured to absorb and release lithium; a negative electrode having a negative electrode active material configured to absorb and release lithium; and a solid electrolyte placed between the positive electrode and the negative electrode to conduct lithium ion. This lithium secondary battery may be an all-solid lithium secondary battery. In the case of the complex having a positive electrode active material layer formed on the solid electrolyte layer described above, the negative electrode active material included in the structure of the lithium secondary battery may be, for example, an inorganic compound such as lithium metal, a lithium alloy or a tin compound, a carbonaceous material configured to absorb and release lithium ion or a conductive polymer. Available examples of the carbonaceous material include cokes, glasslike carbons, graphites, carbons having difficulty in graphitization, pyrolytic carbons and carbon fibers. The negative electrode active material may otherwise a lithium vanadium composite oxide such as $LiV_2O_3$, a lithium titanium composite oxide such as $Li_4Ti_5O_{12}$ or a nitride such as $Li_{3-m}Co_mN$ ($0.3 \le m \le 0.5$). In manufacture of the lithium secondary battery, such negative electrode active material may be formed in a plate-like shape and joined with the complex. In another example, a negative electrode composite material formed to a paste by addition of, for example, a binding agent and a solvent may be applied and dried on the other surface of the solid electrolyte. In yet another example, lithium metal or a lithium alloy may be deposited on the solid electrolyte. The shape of the lithium secondary battery of the invention is not specifically limited but may be a coin shape, a button shape, a sheet shape, a stacked shape, a cylindrical shape, a flat shape or a rectangular shape. A plurality of such lithium secondary batteries may be connected in series to be used as a power source for electric vehicle. The electric vehicle herein may be, for example, a battery electric vehicle driven by only batteries, a hybrid electric vehicle driven by combination of an internal combustion engine and a motor and a fuel cell vehicle driven by electric power generated by fuel cells.

The structure of the lithium secondary battery of the invention is not specifically limited but may be the structure shown in FIG. 1. FIG. 1 is a diagram illustrating the schematic structure of an all-solid lithium secondary battery 20. This all-solid lithium secondary battery 20 includes a solid electrolyte layer 10 composed of a garnet-type oxide, a positive electrode 12 formed on one surface of the solid electrolyte layer 10 and a negative electrode 14 formed on the other surface of the solid electrolyte layer 10. The positive electrode 12 includes a positive electrode active material layer 12a (a layer containing positive electrode active material) arranged adjacent to the solid electrolyte layer 10 and a power collector 12b arranged in contact with the positive electrode active material layer 12a. The negative electrode 14 includes a negative electrode active material layer 14a (a layer containing negative electrode active material) arranged adjacent to the solid electrolyte layer 10 and a power collector 14b arranged in contact with the negative electrode active material 14a. This all-solid lithium secondary battery 20 has, for example, the positive electrode active material layer 12a and the solid electrolyte layer 10 integrally sintered.

Another aspect of the invention is a manufacturing method of a complex by staking a solid electrolyte configured to conduct lithium and an active material layer configured to absorb and release lithium. This manufacturing method includes a sintering process of sintering a stacked structure of an active material layer and a solid electrolyte layer at 900° C. or lower temperature, wherein the solid electrolyte layer includes: a base material mainly including a fundamental composition of $Li_{7+X-Y}(La_{3-x},A_x)(Zr_{2-Y},T_Y)O_{12}$ (where A is one or more of Sr and Ca, T is one or more of Nb and Ta and $0 \le X \le 1.0$ and $0 \le Y < 0.75$ are satisfied) as the main component; and an additive component including lithium borate and aluminum oxide. The manufacturing method of the complex may include, for example, a base material preparing process of preparing the base material, a stacking process of producing a stacked structure of the active material layer and the solid electrolyte layer including the base material and the additive component, and a sintering process of sintering the stacked structure. Herein the active material layer may be a positive electrode active material layer, a negative electrode active material layer, or both a positive electrode active material layer and a negative electrode active material layer formed on the two surfaces of the solid electrolyte. The active material layer is preferably a positive electrode active material layer. In other words, the complex of the invention preferably includes a solid electrolyte layer and a positive electrode active material layer. For convenience of explanation, the following mainly describes the manufacturing method of the complex having the positive electrode active material layer and the manufactured complex.

(Base Material Preparing Process)

This process prepares the base material mainly including the garnet-type ion conducting oxide of the above fundamental composition as the main component. This base material preparing process may include a mixing step of mixing the respective raw materials of the base material and a calcining step of calcining the mixed raw materials. The mixing step mixes the raw materials containing Li, La, Zr and the element A and the element T as appropriate. In the process of mixing the raw materials, Li, La, Zr, the element A and the element T may be mixed at a mixing ratio expressed by the fundamental composition of $Li_{7+X-Y}(La_{3-x},A_x)(Zr_{2-Y},T_Y)O_{12}$. Mixing both the elements A and T may be omitted, or mixing only the element T or mixing only the element A may be omitted. The element A may be one or more elements of Sr and Ca. Between them, Sr is more preferable in terms of the ion radius. Alternatively Ca is more preferable in terms of improving the electric conductivity (lithium ion conductivity). The element T may be one or more elements of Nb and Ta, and Nb is more preferable between them. In the fundamental composition formula, X satisfies $0 \leq X \leq 1.0$. X is preferably not less than 0.15 and is more preferably not less than 0.20. X is also preferably not greater than 0.85 and is more preferably not greater than 0.75. Such setting advantageously allows for low-temperature firing. In this fundamental composition formula, Y satisfies $0 \leq X < 0.75$. Y is preferably not less than 0.15 and is more preferably not less than 0.20. Y is also preferably not greater than 0.60 and is more preferably not greater than 0.50. Such setting further enhances the lithium ion conductivity. With regard to these variables X and Y, X may be equal to Y or alternatively X may be different from Y, but $X < Y$ is more preferable. The relationship of $X < Y$ further enhances the lithium ion conductivity.

The raw materials of the base material may be used in the form of, for example, hydroxides, oxides, chlorides, carbonates, nitrates, sulfates and acetates. Among them, using hydroxides is more preferable. For example, the raw materials of Li, La and the element A may be hydroxides, and the raw materials of Zr and the element T may be oxides. For example, in the case of the base material containing Li, La, Ca (element A), Zr and Nb (element T), it is preferable to use $Li(OH)$, $La(OH)_3$, $Ca(OH)_2$, $ZrO_2$ and $Nb_2O_5$ as the raw materials. Using such raw materials further reduces the calcining temperature for producing the base material. The mixing method of the raw materials may be, for example, a ball mill or a planetary ball mill, and the planetary ball mill is more preferable. In the calcining process, the mixed raw materials are calcined at temperature of or lower than 900° C. This calcining temperature is preferably lower than the sintering temperature in the sintering process and is, for example, preferably lower by about 50° C. to 100° C. than the sintering temperature. This calcining temperature may be in the range of not lower than 650° C. and not higher than 850° C. and is more preferably not higher than 750° C. The element A included in the raw materials of the base material enables the base material to be formed to a garnet-type crystal structure at the lower calcining temperature. The element T included in the raw material of the base material provides the base material with the higher electric conductivity.

(Stacking Process)

This process stacks the solid electrolyte layer, in which the base material is mixed with an additive component, and an active material layer containing an active material. The additive component includes lithium borate and aluminum oxide. The lithium borate is, for example, $Li_3BO_3$ (hereinafter referred to as LBO), $Li_2B_4O_7$ or $LiBO_2$, and $Li_3BO_3$ is more preferable among them. LBO has the lower reactivity with the base material and is accordingly more preferable. The aluminum oxide is, for example, $\alpha$-$Al_2O_3$ (alumina) or $\gamma$-$Al_2O_3$ (alumina), and $\gamma$-alumina is more preferable between them. The molar ratio of aluminum oxide added to 1 mol of the base material is preferably in the range of higher than 0 mol % but not higher than 0.164 mol %, is more preferably in the range of not lower than 0.024 mol % and not higher than 0.160 mol % and is furthermore preferably in the range of not lower than 0.040 mol % and not higher than 0.120 mol %. This is because the molar ratio in this range further enhances the lithium ion conductivity. The volume ratio of lithium borate to the sum of the base material and lithium borate is preferably in the range of not lower than 1.0 vol % and not higher than 20 vol %, is more preferably in the range of not lower than 2.0 vol % and not higher than 15 vol %, and is furthermore preferably in the range of not lower than 5.0 vol % and not higher than 10 vol %. This is because the volume ratio in this range further enhances the lithium ion conductivity.

The active material included in the active material layer may be, for example, a lithium complex compound containing lithium and a transition metal or a lithium complex compound containing at least one or more of Fe, Co, Ni and Mn. The complex compound may be, for example, a composite oxide containing lithium and a transition metal or a phosphate compound containing lithium and a transition metal. The composite oxide is, for example, a lithium manganese composite oxide such as $Li_{(1-n)}MnO_2$ ($0<n<1$, the same shall apply hereafter) or $Li_{(1-n)}Mn_2O_4$, a lithium cobalt composite oxide such as $Li_{(1-n)}CoO_2$ or a lithium nickel composite oxide such as $Li_{(1-n)}NiO_2$. The phosphate compound is, for example, $LiFePO_4$. Lithium borate may be added as the additive component in the active material layer. This lithium borate may be the same as the lithium borate included in the solid electrolyte layer. This additive component is preferably added at the mass ratio in the range of not lower than 5 mass % and not higher than 35 mass %. The sintering temperature of the active material layer is, for example, preferably not higher than 900° C., is more preferably not higher than 850° C. and is furthermore preferably not higher than 800° C. The sintering temperature of this active material layer is preferably not lower than 750° C. It is preferable to add the additive component (sintering aid) such as to achieve the above temperature range.

A procedure employable for the stacking process of the solid electrolyte layer and the active material layer may mold the powder of solid electrolyte and subsequently mold the powder of active material added on this molded body. Another procedure employable for this stacking process may mold the powder of the active material and subsequently mold the powder of solid electrolyte added on this molded body. Yet another procedure employable for this stacking process may stack and press a molded body of the powder of active material and a molded body of the powder of solid electrolyte. The stacked structure is preferably molded by mold pressing. The molding pressure may be, for example, in the range of not lower than 10 kgf/cm² and not higher than 200 kgf/cm².

(Sintering Process)

This process sinters the stacked structure produced as described above at temperature of or lower than 900° C. This sintering temperature is preferably not higher than 850° C. and is more preferably not higher than 800° C. In terms of enhancing the density, this sintering temperature is preferably not lower than 700° C. The atmosphere for sintering is preferably in the presence of oxygen and is preferably the air. The sintering time is preferably, for example, in the range of not shorter than 12 hours and not longer than 24 hours. The complex can be produced by these processes.

The complex having the garnet-type ion conducting oxide of the invention as the solid electrolyte described above allows for the lower-temperature sintering. The solid electrolyte layer can be sintered integrally with the active material layer. These advantageous effects may be attributed to the following reason. For example, in the case of using both lithium borate and aluminum oxide as the sintering aid, it is expected that chemical reaction between the additive materials and chemical reactions between the additive materials and the base material occur at about 700° C. and lead to mutual diffusion. Using the two or more additive materials further accelerates dissolution and diffusion of the components of these additive materials and causes the respective element components to diffuse the grain boundary of the base material. This attracts the particles to each other to fill the gaps, thus allowing for the lower-temperature sintering. Accordingly, the solid electrolyte of the garnet-type ion conducting oxide can be sintered integrally with an active material layer having a lower sintering temperature (for example, 750° C. to 850° C.) than the sintering temperature of this solid electrolyte. For example, using only aluminum oxide as the additive material does not achieve the effect of decreasing the sintering temperature and causes problems, such as substituting the La site with the Al component and producing a subphase (for example, $LaAlO_3$). When only lithium borate is used as the additive material, on the other hand, addition of a relatively large amount of lithium borate is needed to achieve the sufficient effect of decreasing the sintering temperature. This causes a problem of decreasing the electric conductivity. The aspect of the invention, however, uses the two additives, lithium borate and aluminum oxide, in combination, so as to further suppress a decrease of the electric conductivity and allow for the lower-temperature sintering. Additionally, this decreases the sintering temperature of the solid electrolyte layer to a similar extent to the sintering temperature of the active material layer and thereby enables the solid electrolyte layer to be sintered integrally with the active material layer.

The invention is not limited to the embodiment described above, but a multiplicity of variations and modifications may be made to the embodiment without departing from the scope of the invention.

For example, the description of the above embodiment regards the complex, the lithium secondary battery including the complex and the manufacturing method of the complex. The invention may be implemented as a manufacturing method of garnet-type ion conducting oxide configured to conduct lithium. In other words, formation of the active material layer may be omitted. This garnet-type ion conducting oxide is capable of conducting lithium and may be used for applications other than the solid electrolyte, for example, for a sensor. This method enables the garnet-type ion conducting oxide to be sintered at the lower temperature.

EXAMPLES

The following describes concrete examples of syntheses of the solid electrolyte and the complex of the invention as experimental examples. Experimental Examples 2 to 4 and 9 to 13 follow the embodiment of the invention, whereas Experimental Examples 1, 5 to 7 and 8 are comparative examples.

[Synthesis of Lithium Borate]

Lithium borate ($Li_3BO_3$, hereinafter referred to as LBO) was synthesized as the additive component. $Li_2O$ and $B_2O_3$ were weighed to achieve specified molar ratios for forming $Li_3BO_3$. The weighed powders were placed with zirconia beads in a zirconia pot and were mixed by using a dry planetary ball mill. The mixing scheme performed mixing 40 cycles, each cycle composed of rotating at the rotation speed of 100 rpm for 3 minutes and resting for 3 minutes. After mixing, the mixture was calcined at 510° C. for 6 hours under a $N_2$ (80 vol %)-$O_2$ (20 vol %) atmosphere. The resulting powder was $Li_3BO_3$.

[Synthesis of Base Material]

The base material having the fundamental composition of $Li_{7+X-Y}$ ($La_{3-x},A_x$)($Zr_{2-y},T_y$)$O_{12}$ (where A=Ca, T=Nb, X=0.05, Y=0.25, i.e., $Li_{6.8}La_{2.95}Ca_{0.05}Zr_{1.75}Nb_{0.25}O_{12}$) was synthesized. $LiOH(H_2O)$, $La(OH)_3$, $Ca(OH)_2$, $ZrO_2$ and $Nb_2O_5$ were used as the starting materials. The starting materials were weighed to achieve specified molar ratios corresponding to the above fundamental composition. The weighed powders were placed with zirconia beads and a solvent in a zirconia pot and were mixed by using a wet planetary ball mill. The mixing scheme performed mixing 40 cycles, each cycle composed of rotating at the rotation speed of 700 rpm for 3 minutes and resting for 3 minutes. The solvent was ethanol. After mixing and drying at 90° C., the mixture was calcined at 700° C. for 48 hours under the air atmosphere. The resulting powder was used as the base material.

[Synthesis of Garnet-Type Solid Electrolyte]

The above base material and the additive component were weighed to achieve specified molar ratios. The additive component was LBO prepared as described above and γ-alumina ($Al_2O_3$). The added amount of alumina was set to 0.08 mol % as the molar ratio of $Al_2O_3$ to 1 mol of the base material. The added amount of LBO was changed in the range of 0 vol % to 34 vol % as the volume ratio of LBO to the sum of the base material and LBO. The weighed powders were placed with zirconia beads in a zirconia pot and were mixed by using a dry planetary ball mill. The mixing scheme performed mixing 40 cycles, each cycle composed of rotating at the rotation speed of 100 rpm for 3 minutes and resting for 3 minutes. After mixing, the mixture was molded to pellets by mold pressing. The resulting molded body was fired (sintered) in the air atmosphere at 850° C. for 48 hours. Solid electrolytes of Experimental Examples 1 to 7 were prepared by changing the added amount of LBO to 0, 2.1, 4.9, 9.7, 15.0, 18.2 and 34.0 vol % as the volume ratio of LBO to the sum of the base material and LBO.

The above base material and the additive component were weighed to achieve specified molar ratios. The additive component was LBO prepared as described above and γ-alumina. The added amount of LBO was set to 10 vol % as the volume ratio of LBO to the sum of the base material and LBO. The added amount of alumina was changed in the range of 0 to 0.164 mol % as the molar ratio of alumina to 1 mol of the base material. The weighed powders were placed with zirconia beads in a zirconia pot and were mixed by using a dry planetary ball mill. The mixing scheme performed mixing 40 cycles, each cycle composed of rotating at the rotation speed of 100 rpm for 3 minutes and resting for 3 minutes. After mixing, the mixture was molded to pellets by mold pressing. The resulting molded body was fired (sintered) in the air atmosphere at 800° C. for 15 hours. Solid electrolytes of Experimental Examples 8 to 13 were prepared by changing the added amount of $Al_2O_3$ to 0, 0.24, 0.040, 0.080, 0.120 and 0.164 mol % to 1 mol of the base material of the solid electrolyte.

(XRD Measurement)

Figure 2:
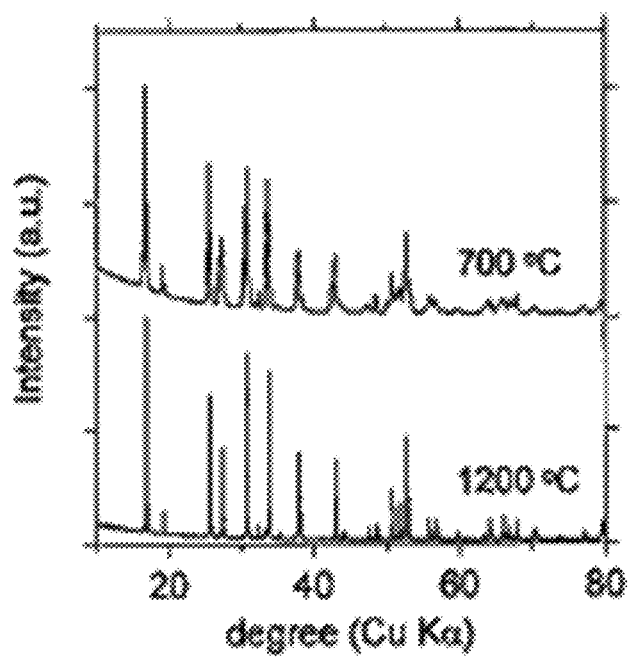
FIG. 2 is a diagram illustrating results of XRD measurement of a garnet-type solid electrolyte.

The powder of the base material (garnet-type solid electrolyte) calcined at 700° C. was subject to XRD measurement. The XRD measurement was performed using an X-ray diffractometer (manufactured by Rigaku Corporation, Ultima IV) under the conditions of CuKα, 2θ: 10 to 80°, 0.01° step/1 sec. A sample of the base material calcined at 1200° C. was similarly measured for the purpose of reference. FIG. 2 shows the results of XRD measurement of the garnet-type solid electrolyte. As shown in FIG. 2, the garnet-type crystal structure was produced by sintering at even 700° C., irrespective of improvement of the relative density in the composition of the base material. This result shows that, for example, the solid electrolyte can be sintered at the sintering temperature in the range of 700° C. to 900° C. The garnet-type solid electrolyte of Experimental Example 13 was crushed to powder and was subject to XRD measurement. The crystal structural analysis was performed using a program for crystal structural analysis: Rietan-2000 (Mater. Sci. Forum, p321-324 (2000), 198).

(SEM Observation)

With regard to Experimental Examples 2, 4 and 7, the surface of the obtained solid electrolyte was observed with a scanning electron microscope (SEM). SEM observation was performed using S-3600N manufactured by Hitachi Hi-Technologies Corporation at the 2000- to 5000-fold condition. EPMA measurement was performed for La, Zr, Nb, Ca, Al and B with regard to Experimental Example 4, and specifically the distributions of Ca and B were measured. JXA-8500F manufactured by JEOL, Ltd. was used for EPMA measurement.

(Density Measurement)

With regard to the obtained garnet-type solid electrolyte, the density was determined by dividing the dry weight measured with an electronic balance by the volume determined from the actual dimensions measured with a caliper. The relative density (%) was then calculated from the ratio of the determined value to a theoretical value.

(Impedance Measurement)

With regard to the obtained garnet-type solid electrolyte, the impedance was measured. More specifically, the impedance was measured in the range of 40 Hz to 110 MHz at 100 mV using an AC impedance measuring instrument (4294A manufactured by Agilent) in a thermostat bath of 25° C. A resistant value was determined from the arc of a Nyquist plot, and the electric conductivity (lithium ion conductivity) was calculated from this resistance value. An intragranular resistance Rb and a grain boundary resistance Rgb were determined from the arc of the Nyquist plot. The ratio of grain boundary resistance (%) was calculated according to the equation of (grain boundary resistance Rgb)/(intragranular resistance Rb+grain boundary resistance Rgb)×100. The lower ratio of grain boundary resistance is more preferable.

(Results of Experiments and Discussion)

Figure 3:
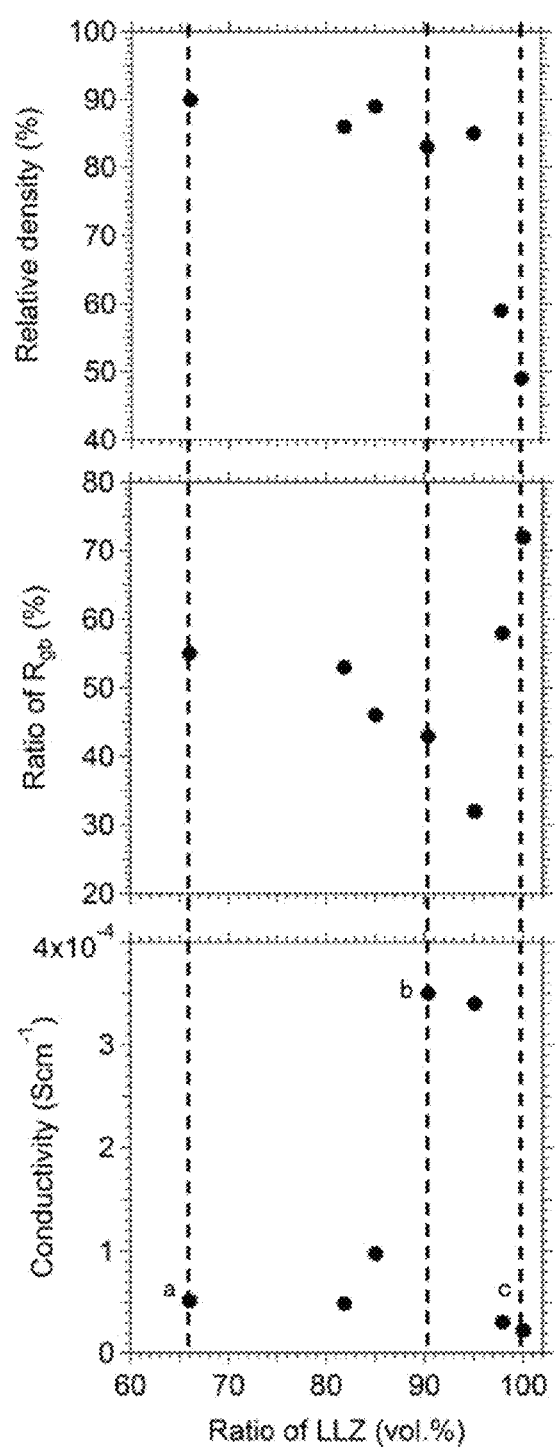
FIG. 3 is relationship diagrams of electric conductivity, ratio of grain boundary resistance and relative density to mixing ratio of LBO and SEM images.
Figure 3:
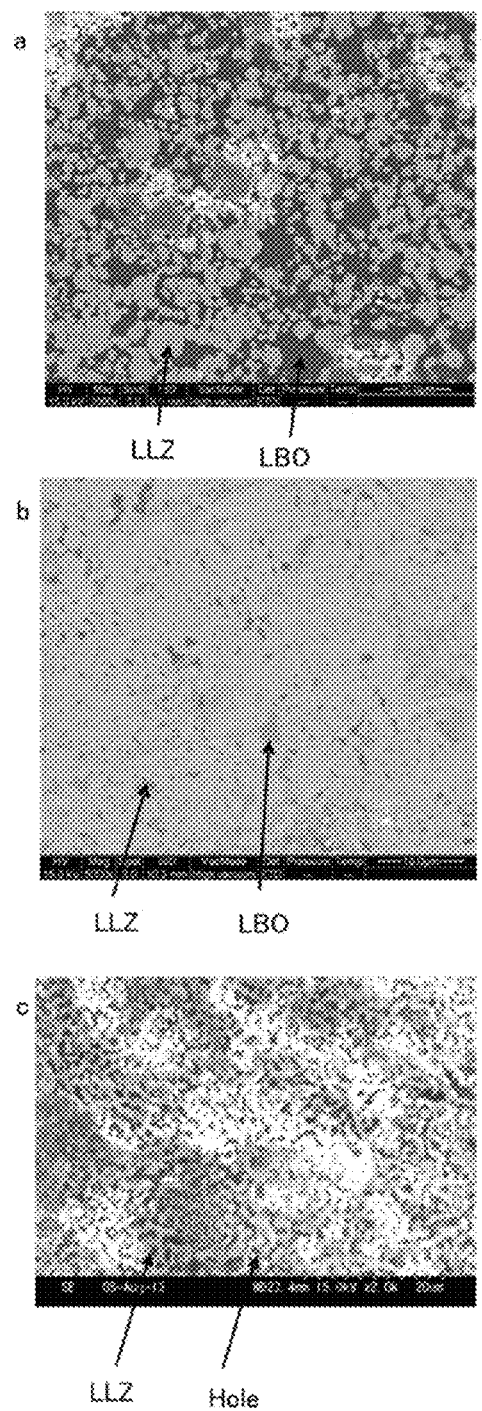
Figure 4:
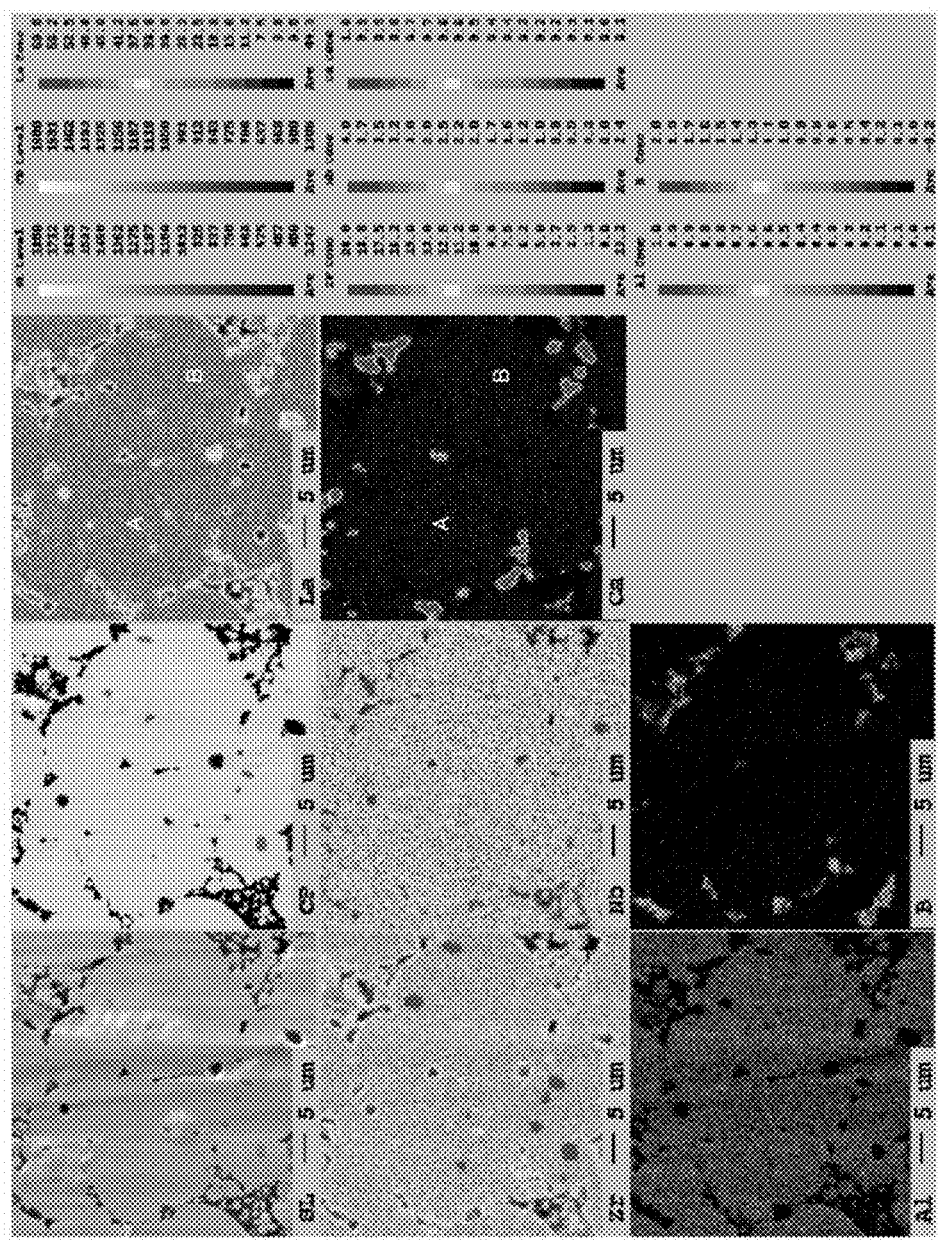
FIG. 4 is SEM images and diagrams illustrating EPMA measurement results of La, Zr, Nb, Ca, Al and B with regard to Experimental Example 4.
Figure 5A:
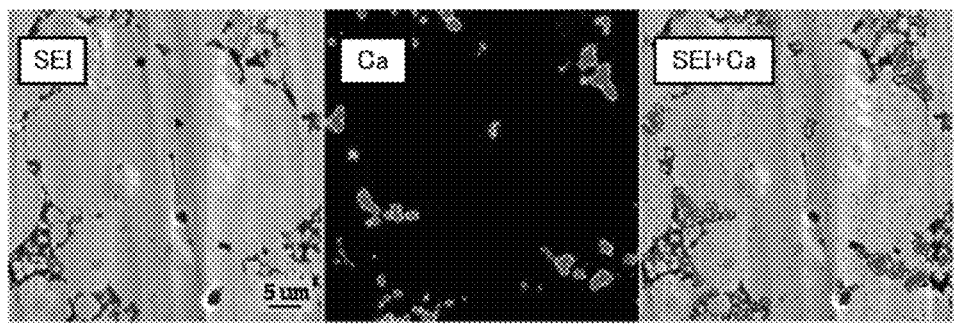
FIGS. 5A and 5B are secondary electron images (SEI) and diagrams illustrating measurement results of Ca and B distributions with regard to Experimental Example 4.
Figure 5B:
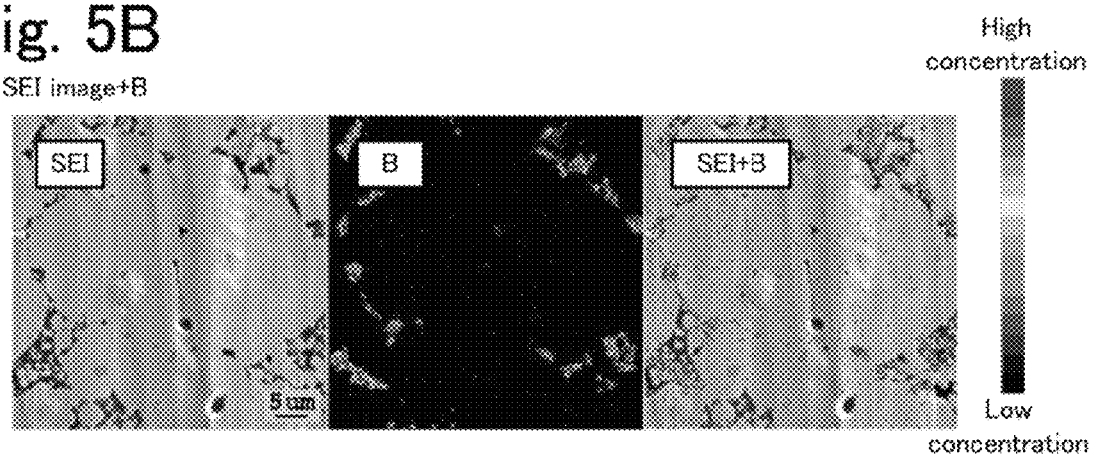
Figure 6:
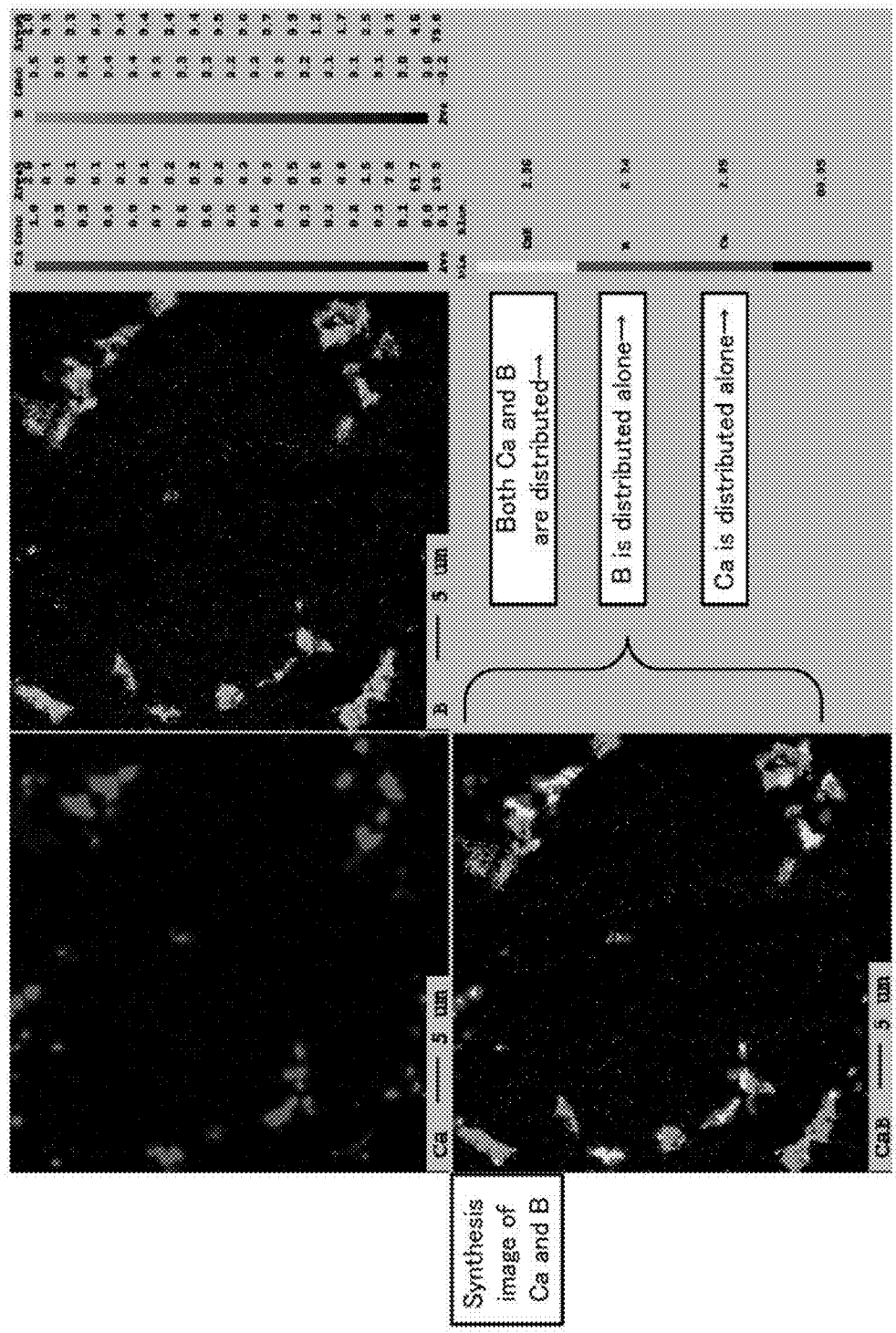
FIG. 6 is diagrams illustrating measurement results of Ca and B distributions with regard to Experimental Example 4.
Figure 7:
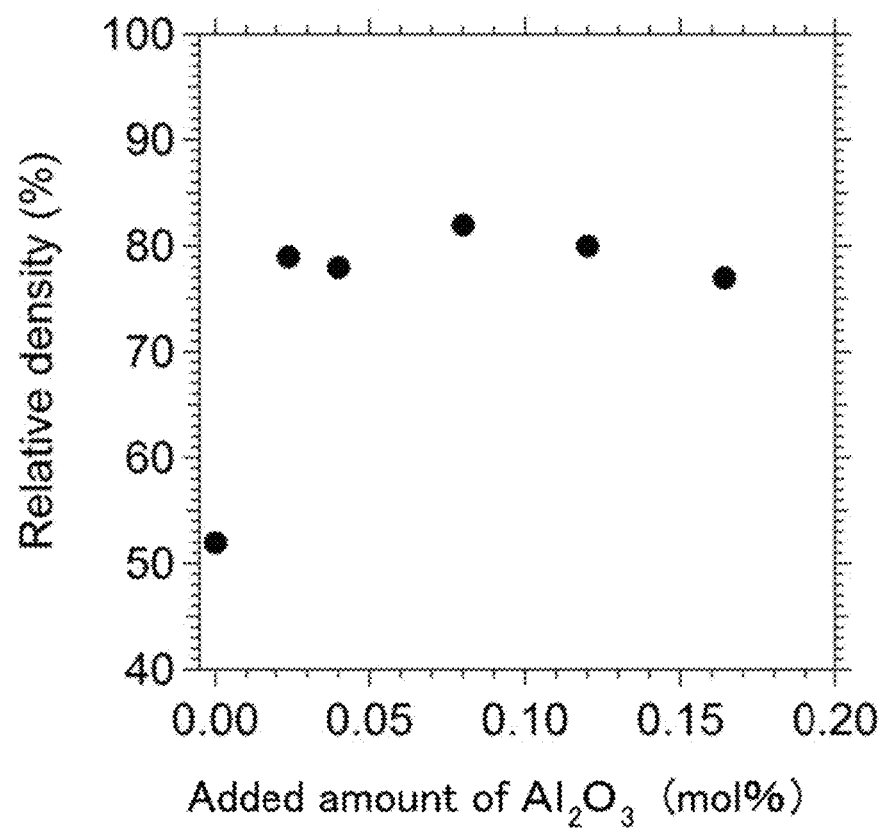
FIG. 7 is a relationship diagram of relative density to added amount of $Al_2O_3$ with regard to Experimental Examples 8 to 13.
Figure 8:
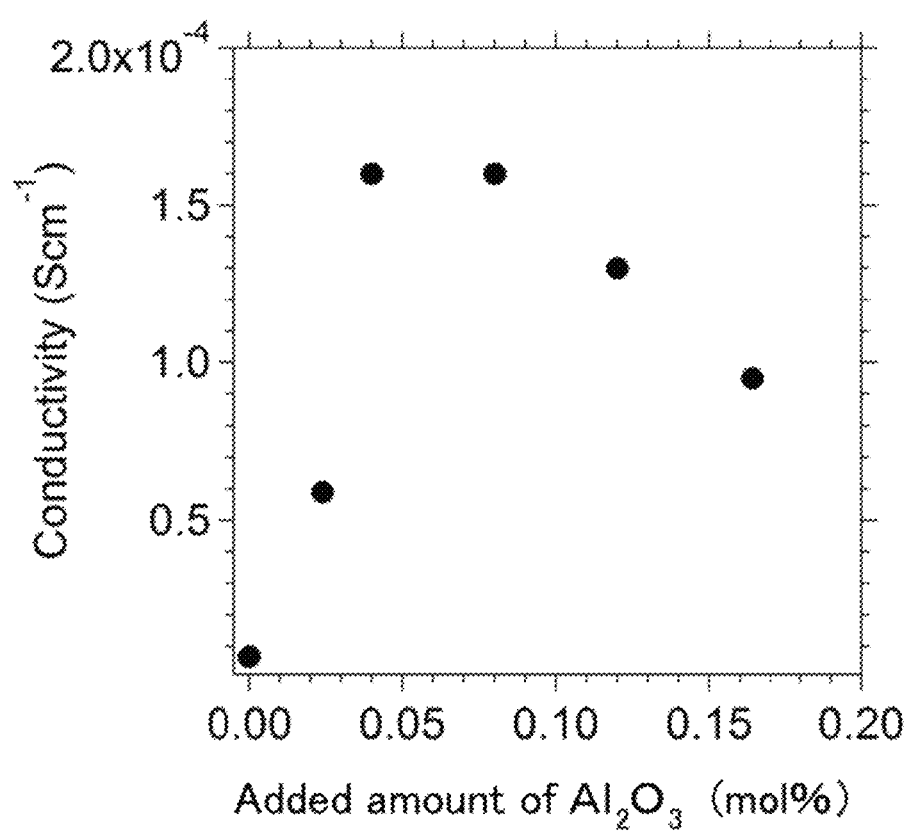
FIG. 8 is a relationship diagram of electric conductivity to added amount of $Al_2O_3$ with regard to Experimental Examples 8 to 13.
Figure 9:
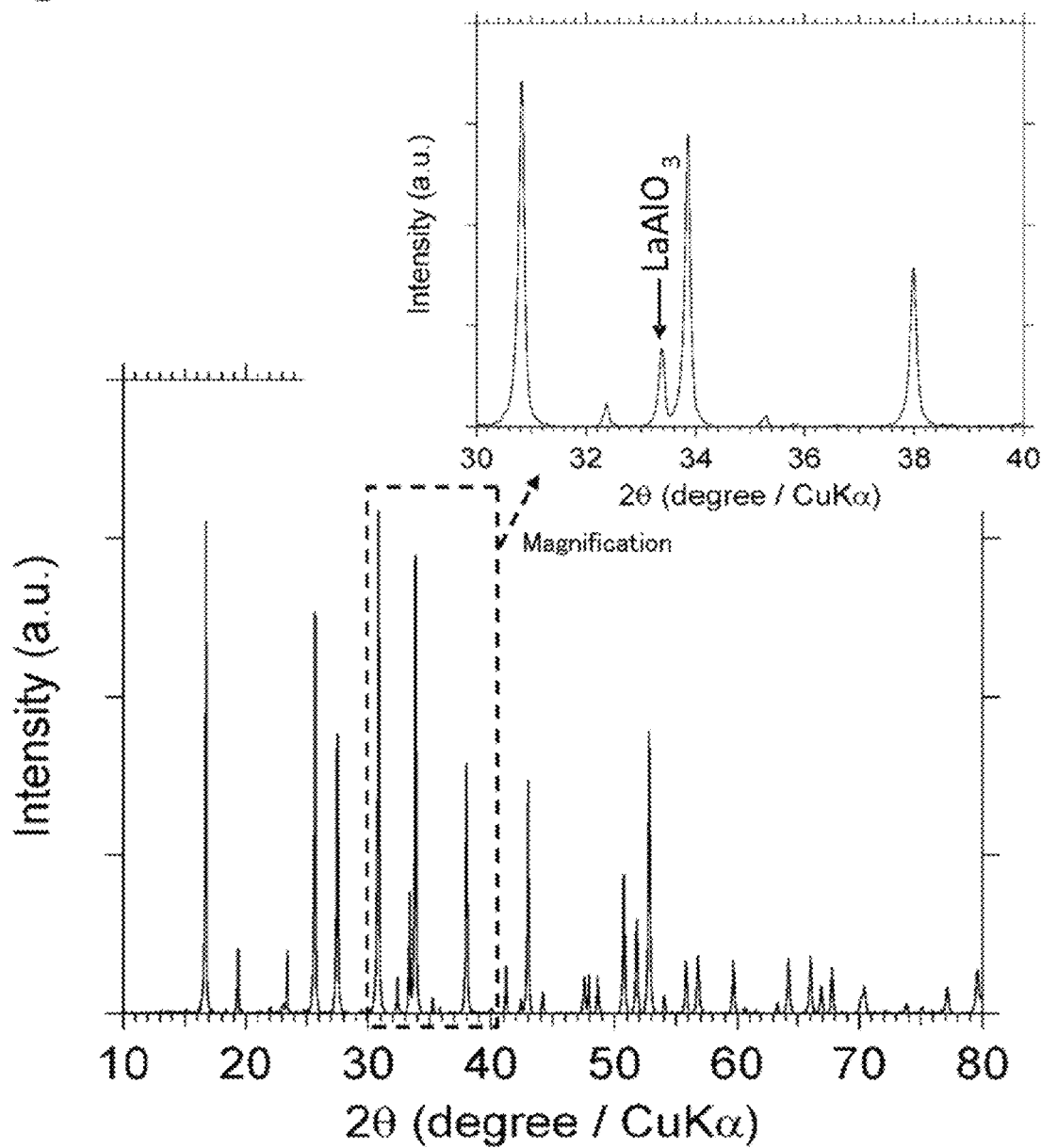
FIG. 9 is a diagram illustrating XRD measurement results with regard to Experimental Example 13.

FIG. 3 is relationship diagrams of electric conductivity, ratio of grain boundary resistance and relative density to mixing ratio of LBO and SEM images with regard to Experimental Examples 1 to 7. FIG. 4 is SEM images and diagrams illustrating EPMA measurement results of La, Zr, Nb, Ca, Al and B with regard to Experimental Example 4. FIGS. 5A and 5B are secondary electron images (SEI) and diagrams illustrating measurement results of Ca and B distributions with regard to Experimental Example 4. FIG. 6 is diagrams illustrating measurement results of Ca and B distributions with regard to Experimental Example 4. FIG. 7 is a relationship diagram of relative density to added amount of $Al_2O_3$ with regard to Experimental Examples 8 to 13. FIG. 8 is a relationship diagram of electric conductivity to added amount of $Al_2O_3$ with regard to Experimental Examples 8 to 13. FIG. 9 is a diagram illustrating XRD measurement results with regard to Experimental Example 13. Table 1 summarizes the measurement results of Experimental Examples 1 to 7. Table 2 summarizes the measurement results of Experimental Examples 8 to 13. More specifically, Tables 1 and 2 summarize the added amount of LBO (vol %), The added amount of $Al_2O_3$ (mol %), the relative density (%), the electric conductivity (S/cm) and the ratio of grain boundary resistance (%). The base material is also called LLZ.

TABLE 1

|  | Added amount of $Li_3BO_3$ vol % | Added amount of $Al_2O_3$ mol % | Relative density % | Electric conductivity S/cm | Ratio of grain boundary resistance % |
|---|---|---|---|---|---|
| Experimental Example 1 | 0 | 0.08 | 49 | $2.3 \times 10^{-5}$ | 72 |
| Experimental Example 2 | 2.1 | 0.08 | 59 | $3.1 \times 10^{-5}$ | 58 |
| Experimental Example 3 | 4.9 | 0.08 | 85 | $3.4 \times 10^{-4}$ | 32 |
| Experimental Example 4 | 9.7 | 0.08 | 83 | $3.5 \times 10^{-4}$ | 43 |
| Experimental Example 5 | 15.0 | 0.08 | 89 | $9.8 \times 10^{-5}$ | 46 |
| Experimental Example 6 | 18.2 | 0.08 | 86 | $4.9 \times 10^{-5}$ | 53 |
| Experimental Example 7 | 34.0 | 0.08 | 90 | $5.2 \times 10^{-5}$ | 55 |

Fundamental composition of solid electrolyte: $Li_{6.8}La_{2.95}Ca_{0.05}Zr_{1.75}Nb_{0.25}O_{12}$
Firing temperature: 850° C.
Ratio of grain boundary resistance: (Grain boundary resistance Rgb)/(Grain boundary resistance Rgb + Intragranular resistance Rb) × 100%

TABLE 2

|  | Added amount of $Li_3BO_3$ vol % | Added amount of $Al_2O_3$ mol % | Relative density % | Electric conductivity S/cm | Ratio of grain boundary resistance % |
|---|---|---|---|---|---|
| Experimental Example 8 | 10.0 | 0 | 52 | $6.8 \times 10^{-6}$ | 75 |
| Experimental Example 9 | 10.0 | 0.024 | 79 | $5.9 \times 10^{-5}$ | 82 |
| Experimental Example 10 | 10.0 | 0.040 | 78 | $1.6 \times 10^{-4}$ | 63 |
| Experimental Example 11 | 10.0 | 0.080 | 82 | $1.6 \times 10^{-4}$ | 61 |
| Experimental Example 12 | 10.0 | 0.120 | 80 | $1.3 \times 10^{-4}$ | 57 |
| Experimental Example 13 | 10.0 | 0.164 | 77 | $9.5 \times 10^{-5}$ | 65 |

Fundamental composition of solid electrolyte: $Li_{6.8}La_{2.95}Ca_{0.05}Zr_{1.75}Nb_{0.25}O_{12}$
Firing temperature: 850° C.
Ratio of grain boundary resistance: (Grain boundary resistance Rgb)/(Grain boundary resistanc Rgb + Intragranular resistance Rb) × 100%

The content of LBO is discussed first. In Experimental Examples 1 to 7, the content of alumina was set to 0.08 mol %, and the content of LBO was changed from 0 to 34 vol %. As shown in FIG. 3, the relative density was enhanced with an increase in content of LBO. The electric conductivity showed a tendency to increase at the content of LBO in the range of 1 to 34 vol %, reach the maximum in the range of 5 to 10 vol % and decrease with a further increase in content of LBO. The ratio of grain boundary resistance showed a tendency to decrease at the content of LBO in the range of 1 to 10 vol % and increase with an increase in content of LBO. As shown in the SEM images of FIG. 3, a composition "a" with a high content of LBO (Experimental Example 7) had a high ratio of LBO sites shown in dark gray, i.e., sites that do not conduct lithium ion. This may lead to that Experimental Examples 5 to 7 having high contents of LBO showed a tendency to have relatively high ratios of grain boundary resistance and low electric conductivities. A composition "b" with a relatively low content of LBO (Experimental Example 4) had a high ratio of base material sites shown in light gray, i.e., sites that conduct lithium ion, and showed a large contact area of the particles of the base material. This may lead to that Experimental Examples 2 to 4 showed a tendency to have relatively low ratios of grain boundary resistance and high electric conductivities.

The element distribution of Experimental Example 4 was measured by EMPA. As shown in FIG. 4, the major elements of the base material such as La, Zr and Nb were distributed at high ratios in relatively bright flat parts of the SEM image. Al was also present at a relatively high ratio in these sites, i.e., present at a high ratio in the base material. As shown in FIGS. 5A and 5B, Ca and B were present at relatively high ratios, on the other hand, in relatively dark parts (grain boundary) of the SEM image. Substantially no Al was present in the grain boundary. As shown in FIG. 6, the grain boundary had sites where Ca or B was present alone and sites where both Ca and B were present. This suggests the presence of Ca and B in the form of a compound in the grain boundary. Ca has been added to the base material and is thus expected to migrate to the grain boundary when being mixed with LBO and alumina as the additive component and sintered. The following sintering mechanism is thus presumed for this solid electrolyte. For example, a chemical reaction occurs between a component (for example, Ca) of the garnet-type ion conducting oxide of the base material and lithium borate in the additive component to form a grain boundary phase. The compensating reaction of $Al_2O_3$ at the cation sites decreased by withdrawal of Ca from the base material may cause Al to be introduced into the base material. Accordingly, the sintering process causes diffusion of elements, i.e., withdrawing the element A (Ca) from the base material and introducing Al by way of compensation, and accelerates the grain growth of the base material. This may result in further decreasing the sintering temperature of the garnet-type ion conducting oxide. The expected reaction formula are: $Li_{7+X-Y}(La_{3-X},A_X)(Zr_{2-Y},T_Y)O_{12}$ (base material)+$Li_3BO_3$ (additive material)+$zAl_2O_3$ (additive material) (where A is either Ca or Sr, T is either Nb or Ta and $0 \leq X \leq 1.0$, $0 \leq Y < 0.75$ and $0 < Z < 0.1$ are satisfied) prior to sintering; and $(Li_{7-Y-6Z},Al_{2Z})(La_{3-X},A_{X-x'})(Zr_{2-Y},T_Y)O_{12}$ (base material, $0 \leq X' < X$ is satisfied)+Li—$Ca_{x'}$—B—O (grain boundary compound)+$Li_3BO_3$ (grain boundary compound) after sintering. Even when the element A (Ca or Sr) is not added to the base material, migration of the elements included as impurities from the base material to the grain boundary may trigger the above mechanism.

The amount of Ca in the base material is discussed, based on the measurement results of EMPA of Experimental Example 4. X-ray intensities (k %) of La and Ca in the base material were determined using the element mapping of La and Ca shown in FIG. 4. Table 3 shows X-ray intensities determined at measurement points A and B of FIG. 4. The formulation as the raw materials was $Li_{6.8}(La_{2.95},Ca_{0.05})(Zr_{1.75},Nb_{0.25})O_{12}$, and the composition ratios of La and Ca were respectively 2.95 and 0.05. The amount of Ca (X-X') at the X-ray intensity (k %) of La standardized to 2.95 was 0.005 at both the measurement points. In the above fundamental composition formula, it was estimated that the amount of Ca included as the raw material in the base material was X=0.05, the amount of Ca included in the base material after sintering was (X-X')=0.005, and the amount of Ca migrating during sintering was X'=0.045. The result of ICP analysis performed for the entire sample of Experimental Example 4 showed that the ratio of La to Ca after sintering was 2.95:0.05. This indicates substantially no withdrawal of Ca out of the sample during sintering, reduction in amount of Ca included as the raw material in the base material to about one tenth after sintering, and migration of Ca from the base material to the grain boundary. It is also presumed that Ca migrates from the base material to the grain boundary in any range satisfying $0 \leq X' < X$ in the above fundamental composition formula.

TABLE 3

| Sample Experimental Example 4[1)2)] | X-ray intensity of La k % | X-ray intensity of Ca k % | Ca(X-X')[3)] |
|---|---|---|---|
| Measurement point A | 47.25 | 0.081 | 0.005 |
| Measurement point B | 51.79 | 0.086 | 0.005 |

[1)]Law material composition: $Li_{6.8}(La_{2.95}Ca_{0.05})(Zr_{1.75}Nb_{0.25})O_{12}$
[2)]Composition of product: $Li_{7-Y-6Z}Al_{2Z}La_{3-X}Ca_{X-X'}Zr_{2-Y}Nb_YO_{12}$
[3)]La is standardized to 2.95.

The content of alumina is discussed below. In Experimental Examples 8 to 13, the content of LBO was set to 10 vol %, and the content of alumina was changed from 0 to 0.164 mol %. As shown in FIG. 7, containing alumina enhanced the relative density of the garnet-type solid electrolyte. As shown in FIG. 8, the content of alumina in the range of 0.024 to 0.164 mol % enhanced the electric conductivity of the garnet-type solid electrolyte. More specifically, the electric conductivity reached the maximum at the content of alumina in the range of 0.040 to 0.120 mol %. The electric conductivity showed a tendency to decrease at the content of alumina of or higher than 0.120 mol %. This reason is attributed to the results of XRD measurement shown in FIG. 9. In Experimental Example 13, there was a side phase peak of $LaAlO_3$, in addition to a crystal peak of the base material ($Li_{6.8}La_{2.95}Ca_{0.05}Zr_{1.75}Nb_{0.25}O_{12}$). This indicates that a large content of alumina may cause decomposition of part of the base material by the chemical reaction and may tend to decrease the electric conductivity.

The above results show that a molded body produced by mixing and molding a base material including a garnet-type ion conducting oxide (for example, $Li_{6.8}La_{2.95}Ca_{0.05}Zr_{1.75}Nb_{0.25}O_{12}$ or $Li_{6.75}La_3Zr_{1.75}Nb_{0.25}O_{12}$) and an additive component including lithium borate and aluminum oxide can be sintered at temperatures of not higher than 900° C. as the solid electrolyte. The amount of aluminum oxide added to the base material is preferably in the range of not higher than 0.164 mol % and is more preferably in the range of not lower than 0.040 mol % and not higher than 0.120 mol %. Additionally, the amount of lithium borate added to the base material is preferably in the range of not lower than 1.0 vol % and not higher than 20 vol % and is more preferably in the range of not lower than 5.0 vol % and not higher than 10 vol %. Adding lithium borate and aluminum oxide in such ranges increases the relative density, provides the higher electric conductivity, and allows for the lower-temperature sintering.

[Production of Complex]

A complex was produced by sintering a stacked structure of an active material layer and a solid electrolyte layer in which a base material of a garnet-type solid electrolyte is mixed with an additive component including lithium borate and aluminum oxide. In the active material layer, commercially available $LiCoO_2$ (hereinafter referred to as LCO) was used as a positive electrolyte active material. LOC powder was dry-blended with LBO powder in an alumina mortar. The mixing ratio was LCO: LBO=2:1 as the mass ratio. The solid electrolyte layer was obtained by adding 10 vol % of LBO and 0.08 mol % of alumina to the above base material ($Li_{6.8}La_{2.95}Ca_{0.05}Zr_{1.74}Nb_{0.25}O_{12}$). The complex was integrally sintered by the following process. The raw material powders for forming the solid electrolyte layer were placed in a mold, and the mold was pressed under pressure of 10 $kgf/cm^2$ using a uniaxial press molding machine. One punch was removed from the molding machine, and powder for forming the positive electrode active material layer was placed on the pressed raw material molded body of the solid electrolyte layer and was pressed under pressure of 100 $kgf/cm^2$. This provided a stacked structure of the raw material powder of the positive electrode active material layer and the raw material powder of the solid electrolyte layer. A complex was obtained by firing (sintering) this stacked structure under the condition of 800° C. for 24 hours.

[Production of all-Solid Lithium Secondary Battery]

An Au electrode was formed as a power collector using an ion coater on the surface of the positive electrode active material layer of the complex produced as described above. Lithium metal was then made to deposit as a negative electrode using a thermal deposition machine on the surface of the solid electrolyte layer of the complex in a globe box. This produced an all-solid battery.

(Charge-Discharge Test)

Charge-discharge was performed in a potential range of 3.0 V to 4.05 V ($Li^+/Li$ standard) in a thermostat bath of 25° C. using a potentiostat manufactured by Solartron (solartron 480). The charge-discharge was performed at the current density of 1 $\mu A/cm^2$.

(Results and Discussion)

Figure 10:
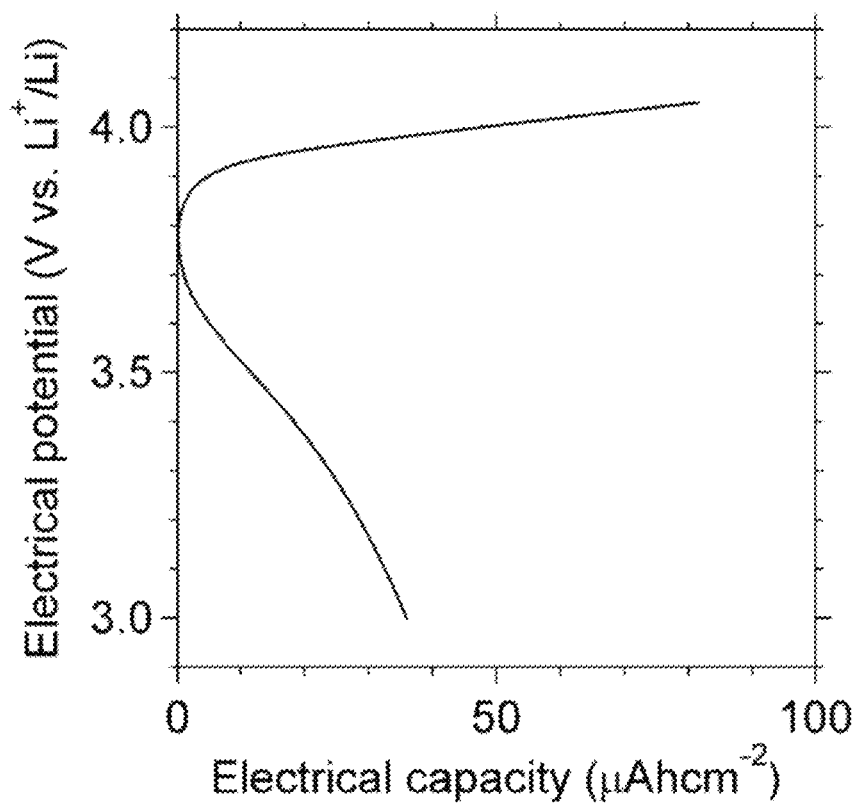
FIG. 10 is a diagram illustrating charge-discharge measurement results of an all-solid lithium secondary battery.

FIG. 10 shows the results of charge-discharge measurement of the all-solid lithium secondary battery produced by stacking and integrally sintering the solid electrolyte layer and the positive electrode active material layer as described above. As shown in FIG. 10, the charge capacity was about 70 $\mu h/cm^2$ and the discharge capacity was 40 $\mu Ah/cm^2$. This indicates the reversible charge and discharge of the integrally sintered complex.

The present application claims priority from Japanese Patent Application No. 2013-173150 filed on Aug. 23, 2013, the entire contents of which are incorporated herein by reference.

INDUSTRIAL APPLICABILITY

The present invention is applicable to all-solid lithium secondary batteries.

What is claimed is:

1. A garnet-type ion conducting oxide configured to conduct lithium, comprising:
    a base material mainly including a composite oxide comprised of at least Li, La, Zr, Al, an element A, wherein A is one or more of Ca and Sr, and an element T, wherein T is one or more of Nb and Ta; and
    a grain boundary product comprised of at least B and the element A.

2. The garnet-type ion conducting oxide according to claim 1, wherein the base material has a fundamental composition of $(Li_{7-Y-6Z},Al_{2Z})(La_{3-x},A_{x-x'})(Zr_{2-Y},T_Y)O_{12}$, wherein $0≤X≤1.0$, $0<Y<0.75$, $0≤Z≤0.1$ and $0≤X'<X$ are satisfied, as a main component.

3. The garnet-type ion conducting oxide according to claim 1, wherein the grain boundary product includes lithium, boron and calcium.

4. The garget-type ion conducting oxide according to claim 1, wherein a volume ratio of the grain boundary product to the base material is in a range of not lower than 1.0 vol % and not higher than 20 vol %.

5. A complex in which a solid electrolyte layer configured to conduct lithium and an active material layer configured to absorb and release lithium are stacked,
    the complex having an integrally sintered stacked structure of the active material layer and the solid electrolyte layer comprised of the garnet-type ion conducting oxide according to claim 1.

6. A lithium secondary battery, comprising the complex according to claim 5.

* * * * *